F. C. SCHOFIELD.
FLASH LIGHT APPARATUS.
APPLICATION FILED AUG. 15, 1911.

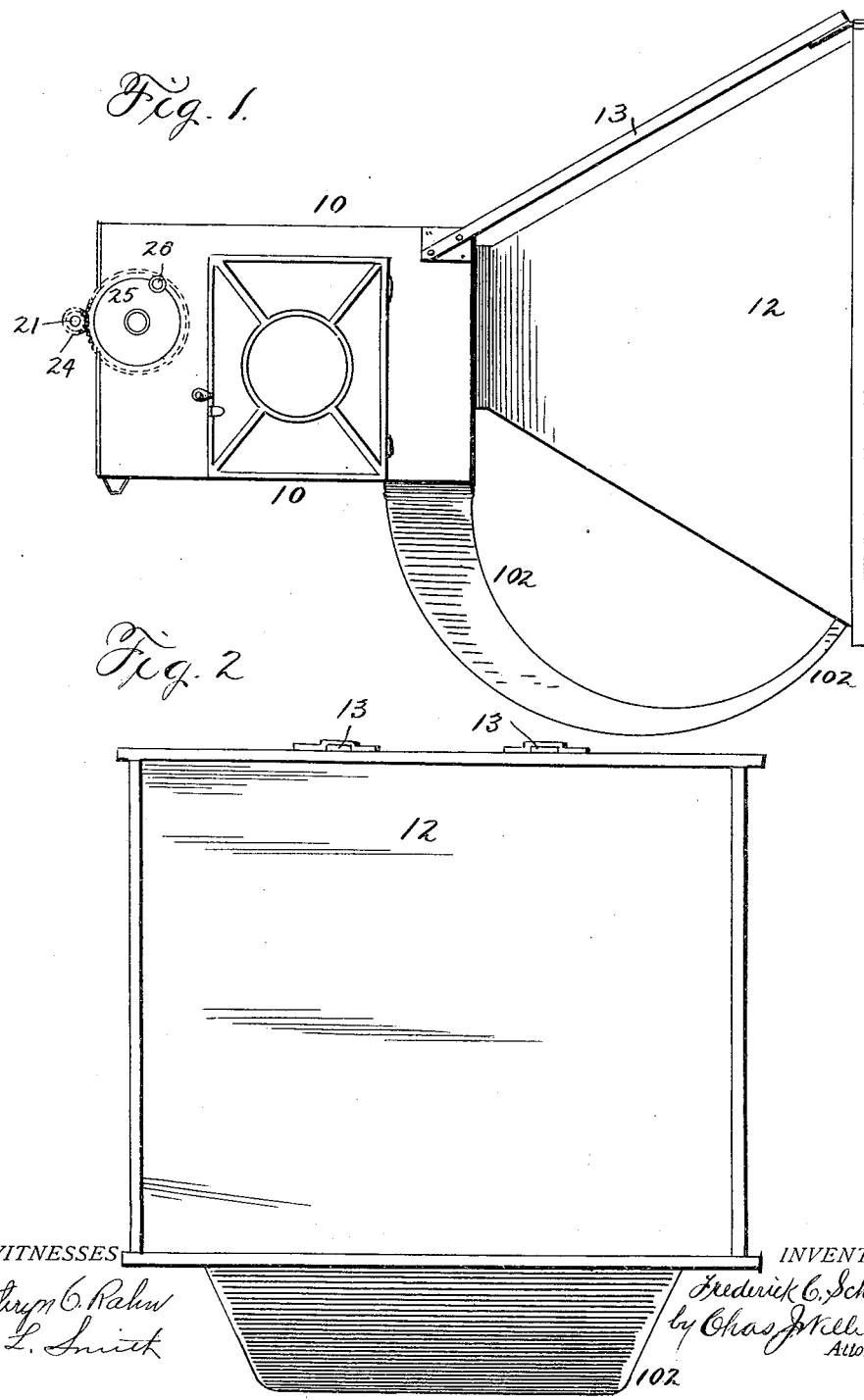

1,124,177.

Patented Jan. 5, 1915.
3 SHEETS—SHEET 2.

WITNESSES
Kathryn C. Rohn
A. L. Smith

INVENTOR
Frederick C. Schofield
by Chas. J. Williamson
Attorney

F. C. SCHOFIELD.
FLASH LIGHT APPARATUS.
APPLICATION FILED AUG. 15, 1911.
1,124,177.
Patented Jan. 5, 1915.
3 SHEETS—SHEET 3.
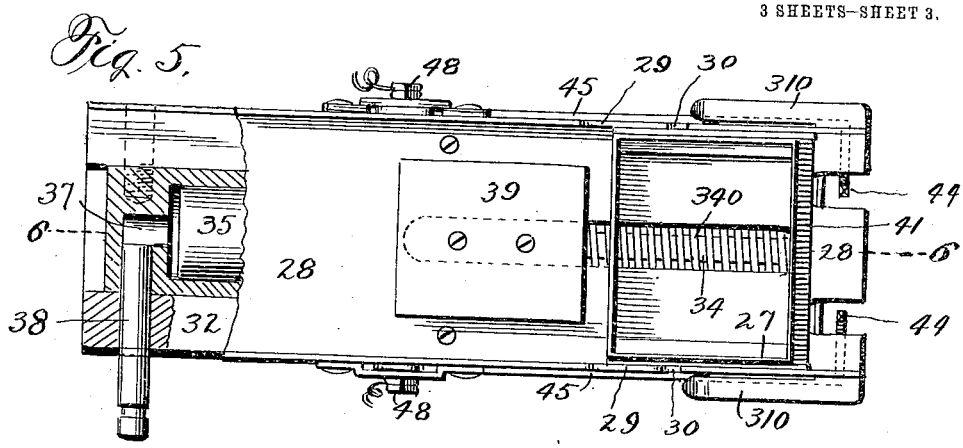
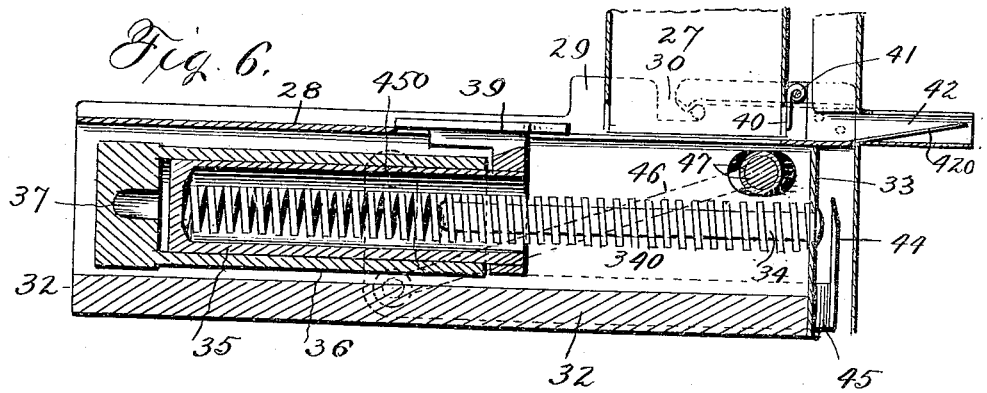
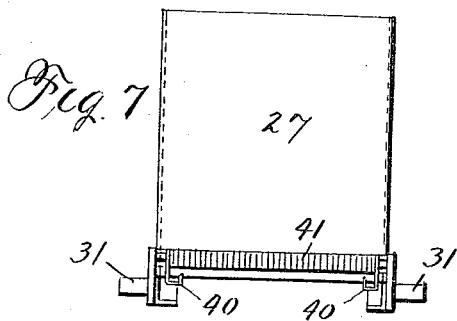
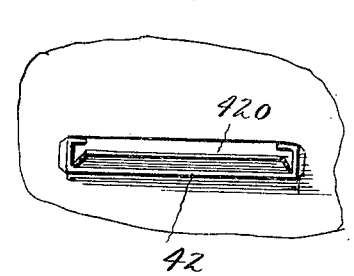
WITNESSES
Kathryn C Rahn
A. L. Smith
INVENTOR
Frederick C. Schofield,
by Chas. J. Williamson,
Attorney
THE NORRIS PETERS CO., PHOTO-LITHO., WASHINGTON, D. C.

UNITED STATES PATENT OFFICE.

FREDERICK C. SCHOFIELD, OF RICHMOND, VIRGINIA, ASSIGNOR TO THE TOWLES-SCHOFIELD COMPANY, INCORPORATED, OF ALEXANDRIA, VIRGINIA; FRED S. SWINDELL, OF WASHINGTON, DISTRICT OF COLUMBIA, TRUSTEE IN BANKRUPTCY OF SAID COMPANY.

FLASH-LIGHT APPARATUS.

1,124,177.   Specification of Letters Patent.   Patented Jan. 5, 1915.

Application filed August 15, 1911. Serial No. 644,214.

*To all whom it may concern:*

Be it known that I, FREDERICK C. SCHOFIELD, a citizen of the United States, of Richmond, in the county of Henrico and in the State of Virginia, have invented a certain new and useful Improvement in Flash-Light Apparatus, and do hereby declare that the following is a full, clear, and exact description thereof.

My invention is an improvement upon a flash light apparatus forming the subject of my Patent No. 946,849, issued January 18, 1910, my object being to improve upon the structure shown in that patent as an embodiment of the invention thereof in respect of the mechanics of the apparatus and to increase the efficiency of the apparatus, and to this end my invention consists in the flash light apparatus constructed substantially as hereinafter specified and claimed.

Figure 3:
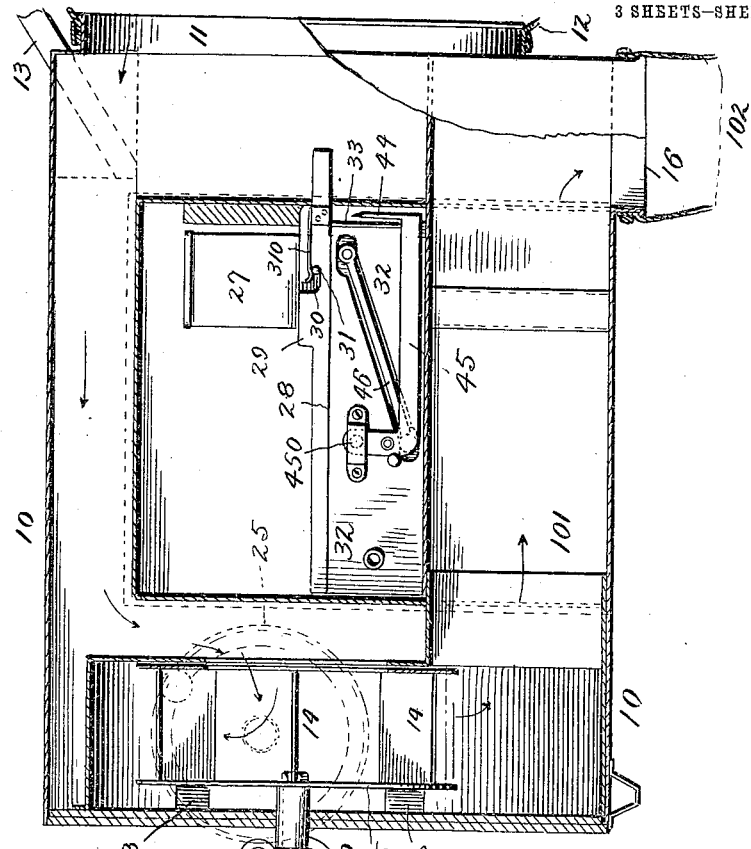
Figure 4:
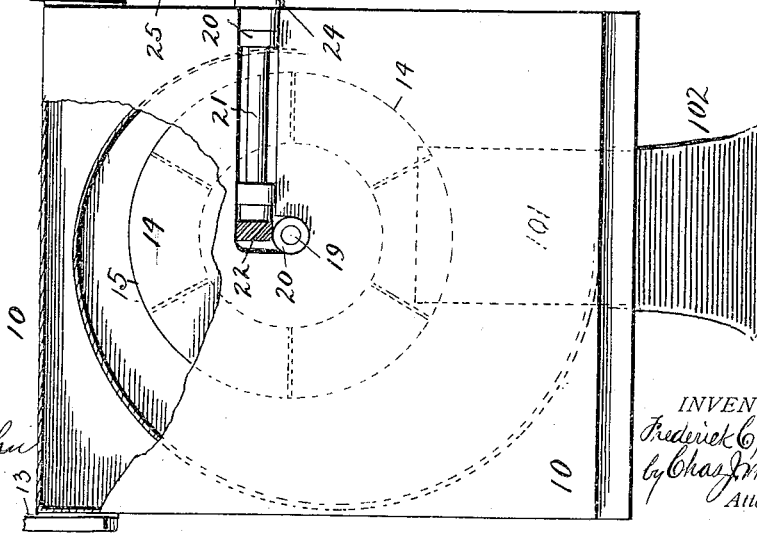

Referring to the accompanying drawings—Figure 1 is a side elevation of a flash light apparatus embodying my invention; Fig. 2 is a front elevation thereof; Fig. 3 is a vertical section of a flash light apparatus embodying my improvements; Fig. 4 a rear elevation with parts broken away to show the general construction; Fig. 5 a top plan view of the cartridge expelling apparatus; Fig. 6 is a longitudinal section on the line 6—6 of Fig. 5; Fig. 7 an end elevation of the cartridge magazine detached; and Fig. 8 is a detail front view of the cartridge exit.

Generally described, as the apparatus which I show in the drawings embodies the invention of my Patent No. 946,849, it will be found to be similar thereto in that it has a magazine for a supply of cartridges, a cartridge expelling and igniting device, a hood or inclosure having a transparent end in which the combustion takes place, and a fan for causing a circulation of the aeroform contents inclosed in the apparatus, so that the solid products of combustion may be collected.

Referring to the drawings it will be found that I employ a box-like casing 10 that is constructed so as to be readily supported on a tripod, and at its front end it has an opening surrounded by a flange 11 for the convenient attachment of the smaller end of an outwardly flaring hood 12 whose walls are preferably made of cloth treated to render it non-inflammable, and whose end wall is of some transparent material that is smoke proof and non-inflammable. The smaller end of the hood has an elastic band as a convenient means of attaching it to the flange 11, and so attaching it as to form a smoke tight joint, while the large front end has a suitable supporting frame and the top bar of which is detachably connected to the end of two arms 13 that are attached to the casing 10 so as thereby to support the hood in position for use.

At the rear end of the casing, and within a compartment therein, is a revolving fan 14 consisting of radial vanes or blades projecting from a disk of hard rubber 15, the chamber for the fan being of snail or volute form with the large end communicating with a passage 101 that thence extends forward in the lower portion of the casing toward the front end thereof where it terminates at an opening in the bottom of the casing that has a downwardly extending flange 16 for the attachment of one end of a tapering tube 102 of cloth whose other end is attached to the bottom wall of the hood 12 near the front end thereof so that the aeroform contents of the apparatus drawn to the fan from the hood 12 and passing rearwardly through a passage 17 in the upper part thereof to the fan, will finally be carried through said tube 102 and delivered again to the hood at the front thereof, thus causing a circulation through the apparatus. The purpose of the tube is to isolate the smoke as completely from the apparatus as possible, so that it may be subjected to the cooling effect of the air enveloping the tube, it having been ascertained that this materially facilitates the precipitation of the smoke particles. An elastic band is also applied to the tube blank for its secure and smoke tight attachment to the flange or neck 16.

The rubber head of the fan rubs against pieces of fur 18 supported contiguous thereto so that I provide for an electrification of the particles of smoke just as in the case of the apparatus of my prior patent.

The fan is secured to one end of the shaft 19 that extends through the rear end wall of the casing and is journaled in an arm of a bracket 20 which is secured by screws to the outside of said end wall, and which bracket also has bearings for a horizontal shaft 21 having at its inner end a spiral gear 22 which meshes with a like gear 23 on the shaft 19, while at its other end said shaft 21 has a pinion 24 with which meshes a gear wheel 25 having a handle 26 for revolving it, and thereby the fan is revolved at a rapid rate of speed.

Situated above the passage 101 and forward of the fan chamber are the cartridge magazine and the expelling and igniting mechanism. The magazine 27 is supported vertically upon the top of a horizontal plate 28 that has on opposite sides upturned flanges 29 with L-shape slots 30 in to which are passed pins 31 on opposite sides of the magazine projecting ends of which pins are engaged by holding springs 310 upon the outer side of each vertical flange of said plate. Thus the magazine is securely, but nevertheless, readily detachably, held in position upon the plate and between the side flanges thereof.

The plate 28 is mounted upon the top of a longitudinal chambered or hollow block 32, preferably of wood, which in cross section has a U-shape, and whose front end is covered or closed by a metal plate 33 from which a rod 34 projects rearwardly into the chamber to form a support and guide for a coil spring 340 that is interposed between said plate 33 and the inner end of a hollow plunger 35 slidably mounted in a cylinder 36 secured in the chamber of the block, and which at its rear end has an air port, or hole 37 from which a pipe 38 leads outward, and to the outer end of which is connected a rubber tube through which air from a bulb form air compressor is passed to act upon the rear end of the plunger 35 to move it forward against the pressure of the spring 340.

The plunger 34 has attached to its forward end an expelling block 39 adapted, when the plunger is moved forward by action of the compressed air, to engage the rear edge of the lowermost cartridge in the magazine and move it forward to expel it and place it in position for igniting. The cartridge emerging from the magazine engages the downwardly extending ends 40 of a coil spring 41 secured to the front wall of the magazine just above the exit or outlet thereof, said spring ends bearing yieldingly upon the upper side of the cartridge as it moves forward. The cartridge expelled from the magazine passes into a supporting guide 42 that is closed on the bottom and each side, and each side has an inwardly projecting flange at the upper edge that overlaps the upper side of the cartridge, and the bottom of the guide having a forwardly and upwardly inclined flat spring 42 that with the spring fingers 40 produces enough friction to prevent the premature expulsion of the cartridge from the guide.

The cartridge used has an electric igniter, and on the underside of the cartridge, there are two contact plates adapted, respectively, to be engaged by contact fingers 44 on vertically swinging arms 45 pivotally connected, respectively, to opposite sides of the chambered block 32, the contact fingers being vertically arranged and sharpened so that when they are moved upward, as hereinafter described, they will penetrate the metal contact plates on the underside of the passing cartridge, and as the parts are so timed that such contact occurs while the cartridge is still moving forward, the contact points will literally plow or gouge the cartridge contacts, and thus make certain of a perfect electrical contact.

The sharpened contact points of the fingers are case hardened so that they will stand the wear incident to their gouging, or plowing action.

The contact carrying arm 45 from its point of pivotal connection with the chambered block 32, is carried downward and then horizontally, and at the angle thus formed, there is pivotally connected one end of a link 46 that thence extends at an incline upward and forward, and the two links 46 at their forward end are connected by a transverse rod or bar 47 which passes through the chambered block and, therefore, in the path of the forward movement of the plunger 35, and in due time before movement of the plunger 35 is completed, said connecting bar 47 is struck and participating in the forward movement of the plunger it rocks the arms 45 on their pivotal connection and moves the contact points upward into contact with the contact plates of the igniter in the cartridge. The weight of the contact carrying arms is sufficient to cause them to drop when the plunger 35 is moved rearward by the action of its spring.

Each of the contact carrying arms 45 has a binding post 48 for the attachment of the terminal of a conducting wire leading from a battery that supplies current to ignite the cartridge.

It is to be understood that changes in details of the apparatus illustrated in the drawings may be made without involving any departure from the scope of my invention as it is set forth in the appended claims.

Having thus described my invention what I claim is—

1. A flash light apparatus embodying a chamber in which a charge of flash light powder may be burned, said chamber including a forwardly extending hood, a tube communicating with said chamber at two points and being wholly external thereto, one of said points being at the front of the hood, all the side walls of said tube between said two points being exposed to the air on the outside of the apparatus, and means for causing a circulation of the aeroform contents of said chamber through said tube.

2. A flash light apparatus having a closed casing provided at one end with a chamber in which a charge of flash light powder may be burned, said chamber including a forwardly extending hood, a tube wholly exterior thereto connected at one end to said hood and at the other end to said casing, all the side walls of said tube between its ends being exposed to air on the outside of the apparatus, and in communication with both, and a fan mounted in said casing.

3. A flash light apparatus comprising a casing, a hood of flexible material detachably connected to said casing and forming a forward extension thereof, and a tube of flexible material wholly exterior to the casing, and said tube communicating at one end with the interior of said hood and at the other end with the interior of the casing and detachably connected with the casing.

4. In a flash light apparatus, the combination of a reciprocating cartridge expeller, a movable contact carrying arm, a slidable bar in the path of a part of the expeller, and a link connection between said bar and said arm.

5. In a flash light apparatus, the combination of a reciprocating plunger, a cartridge feeding member carried thereby, an air cylinder in which said plunger is movable, a pair of pivoted contact carrying arms situated on opposite sides of the plunger, a slidable bar in the path of movement of the plunger, and links connecting said bar and said arms.

6. In a flash light apparatus, the combination of a chambered block, an air cylinder mounted in the chamber of the block, a hollow plunger in said cylinder, a spring entering said plunger at one end and bearing against a relatively stationary part at the other end, a pair of contact arms pivoted to opposite sides of said block, a slidable cross bar passing through the chambered block in the path of the plunger, and links connecting said bar and said contact carrying arms.

7. In a flash light apparatus having a closed casing, a hood extending forwardly from said casing, a tube communicating at one end with said casing and at the other end with the hood, all the side walls of said tube between its ends being exposed to air on the outside of the apparatus, and means for causing a circulation of the aeroform contents of the hood through said tube.

In testimony that I claim the foregoing I have hereunto set my hand.

FREDERICK C. SCHOFIELD.

Witnesses:
 Geo. A. Arhart,
 Jno. F. Bauer.

Copies of this patent may be obtained for five cents each, by addressing the "Commissioner of Patents, Washington, D. C."